US005468089A

United States Patent [19]

Claude et al.

[11] Patent Number: 5,468,089

[45] Date of Patent: Nov. 21, 1995

[54] BURIED STORAGE TANK WITH A SINGLE FLUID-TIGHT VESSEL FOR THE CONFINEMENT OF A LIQUEFIED GAS FOR EXAMPLE AND ARRANGEMENT OF SUCH STORAGE TANKS

[75] Inventors: Jean M. Claude, Rambouillet; Gerardus H. M. Evers, Crespieres, both of France

[73] Assignees: Societe Nouvelle Technigaz, Montigny-Le-Bretonneux; Soletanche Enterprise, Nanterre, both of France

[21] Appl. No.: 186,975

[22] Filed: Jan. 26, 1994

[30] Foreign Application Priority Data

Jan. 28, 1993 [FR] France .................................... 93 00881

[51] Int. Cl.[6] ........................................ B65G 5/00

[52] U.S. Cl. ........................................ 405/52; 405/55

[58] Field of Search ................................ 405/52, 53, 55, 405/128, 267

[56] References Cited

FOREIGN PATENT DOCUMENTS

| | | |
|---|---|---|
| 0248721 | 12/1987 | European Pat. Off. . |
| 0266335 | 5/1988 | European Pat. Off. . |
| 1407117 | 6/1965 | France . |
| 2188654 | 1/1974 | France . |

*Primary Examiner*—David H. Corbin

*Attorney, Agent, or Firm*—Steinberg, Raskin & Davidson

[57] ABSTRACT

A buried fluid storage tank with a single fluid-tight enclosure which comprises an external concrete enclosure buried into the ground, a rigid structure with a bottom slab and possibly a covering dome as well as a fluid-tight heat-insulating envelope which defines inside of the structure a fluid loading space, whereas the external enclosure has the shape of a thick substantially fluid-tight wall, this enclosure as well as the covering dome being made integral with each other from one single piece of material and forming together with the bottom slab the stiffening structure of the tank, the invention being applicable to a confinement tank in particular for a harbor terminal for loading a liquefied natural gas.

15 Claims, 2 Drawing Sheets

P
2
28
66
32
352
IV
24
64
6
3
36
37
III
365
4
64
35
70
1
S
2
57
55
56
57
52
54
56
4
55

BURIED STORAGE TANK WITH A SINGLE FLUID-TIGHT VESSEL FOR THE CONFINEMENT OF A LIQUEFIED GAS FOR EXAMPLE AND ARRANGEMENT OF SUCH STORAGE TANKS

"Buried storage tank with a single fluid-tight vessel for the confinement of a liquefied gas for example and arrangement of such storage tanks."

BACKGROUND OF THE INVENTION

The present invention relates to a buried storage tank with a single fluid-tight vessel or enclosure for the confinement of any fluid whatsoever such in particular as a liquefied cryogenic gas. More particularly the invention relates to a storage tank for the confinement of a liquid natural gas, for example for a cargo loading harbour terminal.

There has already been proposed mainly in the case of plants or equipments founded or established on a relatively loose ground to at least partially bury a tank for warehousing or "storing" a fluid such for instance as a liquid fuel. Such a solution permits with respect to conventional "elevated" tanks to reduce the surface area at the ground and to limit the impact upon the environment of the equipment while offering a high safety level.

There in particular exists one type of buried tank comprising an external concrete vessel or enclosure buried into the ground and provided to allow the excavation into the latter of a cavity of corresponding shape. A rigid structure is provided within the external vessel or enclosure. This structure, which is made from reinforced concrete or from metal comprises a bottom slab or flooring bed and a covering cupola or dome. A fluid-tight heat-insulating envelope is fastened inside of the rigid structure and defines within the latter a space where the fluid to be "stocked" or stored may be confined. Generally the rigid structure consists of a second internal reinforced concrete enclosure or vessel wherein the bottom slab which is formed of a cast flooring bed is set in.

Such a tank comprising an external enclosure and an internal enclosure is wearisome to be made and proves to be complex and expensive.

Moreover in the case of plants on the coast or shore or which may be submersed, the water contained in the ground may exert very great forces upon the rigid structure of the conventional buried tanks and in particular upon their bottom slabs or flooring beds since the external enclosure does not permit to properly isolate the inside of the tank from water seepage. Thus with a conventional buried tank with a capacity of the order of 100,000 $m^3$, it is frequent that the flooring bed be subjected under the effect of the water contained in the ground to a lifting force of the order of 40 $t/m^2$. Then in order to provide for the stability and the holding of the tank, the combined action of the mass of the latter and of the friction essentially between the flooring bed, the concrete enclosures and the ground should correspond nearly to that of a mass of 100,000 t.

Furthermore the conventional buried tanks should be provided while being built with devices for pumping the water with a substantial flow rate underneath their flooring bed to allow the excavation to be kept dry.

OBJECTS AND SUMMARY OF THE INVENTION

Therefore the object of the present invention is to cope in particular with the inconveniences of the prior art referred to hereinabove and to propose a buried tank the structure of which is at a time simple, strong and not very costly.

For that purpose the subject of the invention is a storage tank for the confinement of any fluid whatsoever such in particular as a liquefied cryogenic gas and of the type comprising an external enclosure made from molded concrete, buried into the ground, a rigid structure with a bottom slab or flooring bed and possibly a covering dome or cupola as well as a fluid-tight and heat-insulating envelope which defines inside of the structure a loading space for the fluid, characterized in that the external enclosure has the shape of a thick and substantially fluid-tight wall, this enclosure as well as the covering dome being integrally made from one piece of material and constituting together with the bottom slab the rigid structure of the tank.

It should be noted here that advantageously the base of the aforesaid external enclosure extends down at least to the vicinity of a substantially impervious layer of the ground.

According to another characterizing feature of the invention the bottom slab has the shape of a reinforced concrete flooring bed freely resting on the one hand upon one or several bearing seats integral with the external enclosure and on the other hand upon a draining system.

It should be further pointed out here that the reinforced concrete flooring bed preferably has a smaller thickness than that of the external enclosure.

Preferably the aforesaid insulating envelope comprises a fluid-tight metal membrane fastened inside of the external enclosure and upon the bottom slab through the medium of a heat-insulating layer.

In such a case the insulation layer could advantageously comprise at least one thickness of rigid panels for the distribution of the stresses as well as at least one thickness of panels made from foam of plastics material, which panels may be impervious and connected to each other in fluid-tight relationship by fluid-tight connecting fittings so as to form a continuous and sealed insulation layer.

According to one embodiment of the invention the aforesaid insulating layer is fastened onto the concrete with the assistance of one preferably continuous thickness of adhesive material.

Moreover the aforesaid envelope or vessel comprises a fluid-tight steel cupola fastened in sealed relationship with its periphery to the metal membrane and forming an internal facing or lining for the covering dome as well as a hanging aluminum roof covered with a heat-insulating layer, which is interposed between the fluid-tight envelope and cupola in order to keep the latter nearly at ambient temperature. According to still another characterizing feature, the aforesaid covering dome and possibly fluid-tight cupola are resting upon the external enclosure of the tank through the medium of a crowning or coping beam of corresponding shape. The invention is also directed to an arrangement of buried tanks such as described hereinabove and disposed inside of a substantially fluid-tight, buried and closed, for instance cylindrical wall the base of which extends down to at least the vicinity of the aforesaid substantially impervious layer of the ground.

BRIEF DESCRIPTION OF THE DRAWINGS

The invention will be better understood and further objects, characterizing features, details and advantages thereof will appear more clearly as the following explanatory description proceeds with reference to the attached diagrammatic drawings given by way of non limiting example only illustrating a presently preferred specific embodiment of the invention and in which.

DETAILED DESCRIPTION OF THE INVENTION

Figure 1:
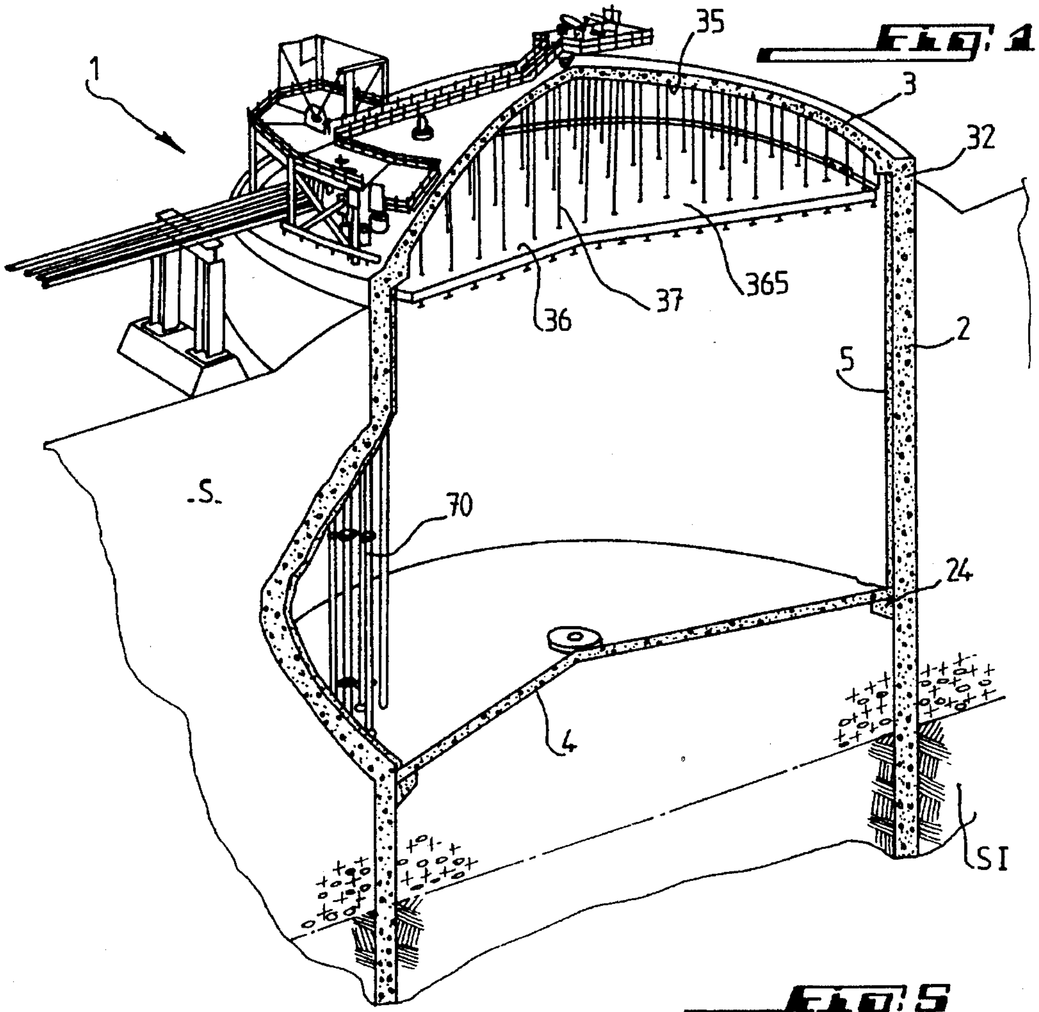
FIG. 1 is a perspective sectional view with parts broken away of a buried tank according to an embodiment of the invention.

On the figures the general reference numeral 1 designates a buried tank. Here the tanks 1 are provided for the confinement of liquid natural gas. Nevertheless many other types of fluids may also be stored or "stocked" in such a tank.

Each tank 1 is a buried tank of the so-called "membrane" type. More specifically the tank 1 comprises an external concrete enclosure 2 which is at least partially buried into the ground itself designated by the reference character S on the figures. The enclosure 2 which is nearly cylindrical defines in the ground S an excavation or cavity of corresponding shape.

The buried tank 1 comprises a rigid structure, i.e. a structure providing for the stability and the holding of the tank 1 under the effect of stresses which may be applied thereto. The rigid structure here is provided with a covering dome 3 disposed above the enclosure 2 and projecting from the ground S. It is however possible to contemplate that the tanks 1 do not have any covering dome. The rigid structure of the tank 1 also has a bottom slab 4 arranged in front of or plumb with the dome 3 or top of the tank 1 and the shape of which corresponds substantially to that of the cavity defined by the external enclosure 2. On the figures it is seen that the covering dome 3 as well as the bottom slab 4 are works made from cast and reinforced concrete.

On the figures is also seen an envelope 5 which defines inside of the cavity defined by the external enclosure 2 as well as by the dome 3 and the slab 4, a loading and confinement space for the fluid to be stored. The envelope 5 is fluid-tight and also performs the function of thermally insulating fluid stored within the tank 1 from the structural concrete elements 2, 4 and possibly 3.

According to the invention the external enclosure 2 has the shape of a thick and substantially fluid-tight wall with which the covering dome 3 is advantageously made integral into one single piece of material so that they form together with the bottom slab 4 the rigid structure of the corresponding tank 1.

It is already understandable that since the external enclosure 2 is fluid-tight and exhibits a thickness and a stiffness great enough to withstand internal and external stresses which are applied to the tank, the erection of this tank is simplified and its making requires less material.

Owing to its rigid structure it is possible and often advantageous to provide that the external enclosure 2 extends deeply into the ground down to the vicinity of a substantially impervious layer SI of the latter in order that the water seepage into the cavity defined by the tank 1 be minimized to a large extent. It is of course also possible that the enclosure 2 positively projects into the very inside of the naturally impervious layer SI of the ground. Thus the forces produced by the water contained in the ground S and which tend to lift the slab 4 are greatly reduced. Thus owing to the limitation of the external forces applied to the tank 1 and especially owing to the fact that the external enclosure 2 and the rigid structure are made integral with each other, the tank 1 has a simpler construction and requires much less material for its manufacture than the equivalent tanks of the prior art.

In connection with the same idea since the water seepage into the tank 1 is minimized and the stresses tending to lift the slab 4 therefore are very much reduced with respect to the known tanks, the thickness (and therefore the mass) of this bottom slab 4 may also be minimized. As it appears from instance from FIGS. 1 and 2 the bottom slab 4 even has a smaller thickness than that of the external enclosure 2.

Therefore with a tank 1 according to the invention with a fluid capacity of about 100,000 $m^3$, the thickness of the external enclosure 2 may be about 2.20 m and that of the bottom slab nearly 1 m only. Now it is known that with an equivalent tank of the prior art, the thickness of the external enclosure and of the vertical rigid structure is more than 3 m whereas the bottom slab may reach a height of 7 m.

Now this bottom slab 4 will be described in greater detail. On the figures the latter has the shape of a reinforced concrete flooring bed which freely rests on the one hand upon one or several seats integral with the enclosure 2 and on the other hand upon a draining system 6.

Here the periphery of the bottom flooring bed 4 is bearing without being set in upon a seat or flange 24 having the shape of an annular bracket and made integral with the enclosure 2. Such a construction of the flooring bed without being set in the vertical walls of the tank 1 fully differentiates from the prior art.

The draining system 6 in turn essentially comprises a second flooring bed consisting of porous aggregates arranged on the bottom of the cavity excavated in the ground S. Thus when water is seeping into the enclosure 2, the latter is drained through the second flooring bed 6 towards discharge pumps (not shown). As illustrated on FIG. 2, these pumps are discharging in one or several wells or pits P formed in the ground S close to the tank 1 through the agency of pipelines or ducts 66 formed through the enclosure 2.

It should also be emphasized here that according to the illustrated embodiment, the tank 1 is provided with a device for shielding its concrete elements from frost. This device comprises on the one hand pipelines or ducts 64 (FIG. 2) for the circulation of a hot fluid such as water for instance provided underneath the bottom slab 4, i.e. inside of the second flooring bed 6 and on the other hand conventional electrical heating cables 28 (FIG. 2) arranged within galvanized steel tubes themselves embedded into the concrete of the external enclosure 2 substantially up to the level of the slab 4.

Another major difference between the invention and the known tanks relates to the structure proper of the external enclosure 2. In addition indeed to the fact that the latter is load-carrying and fluid-tight, the enclosure 2 is made from reinforced concrete directly molded or cast into the ground S.

More specifically this enclosure 2 is provided by digging into the ground S a trench of corresponding shape and then by casting a concrete of suitable composition into the trench after having disposed therein reinforcement cages as well as the heating cables 28. Such a wall may for example be obtained by means of a device of the type of the one designated under the name of "Hydrofraise" and developed by the company "Solétanche". This kind of apparatus permits to make concrete walls with a depth of 70 to 80 m under very accurate conditions and very precise dimensional tolerances (approximately 1%).

Then a sealing lining or facing is applied onto the internal side or excavation of the enclosure 2 for instance by spraying concrete onto a metal lattice, wire netting or grating itself fastened through anchoring onto this enclosure. The facing the thickness of which according to the example referred to hereinabove is about 0.15 m, allows to obtain a smoother surface condition or state of the excavation face. Essentially the state of surface thus obtained should permit a good fastening of the envelope 5 onto the concrete as this will be better explained hereinafter.

Figures 2, 3, 4:
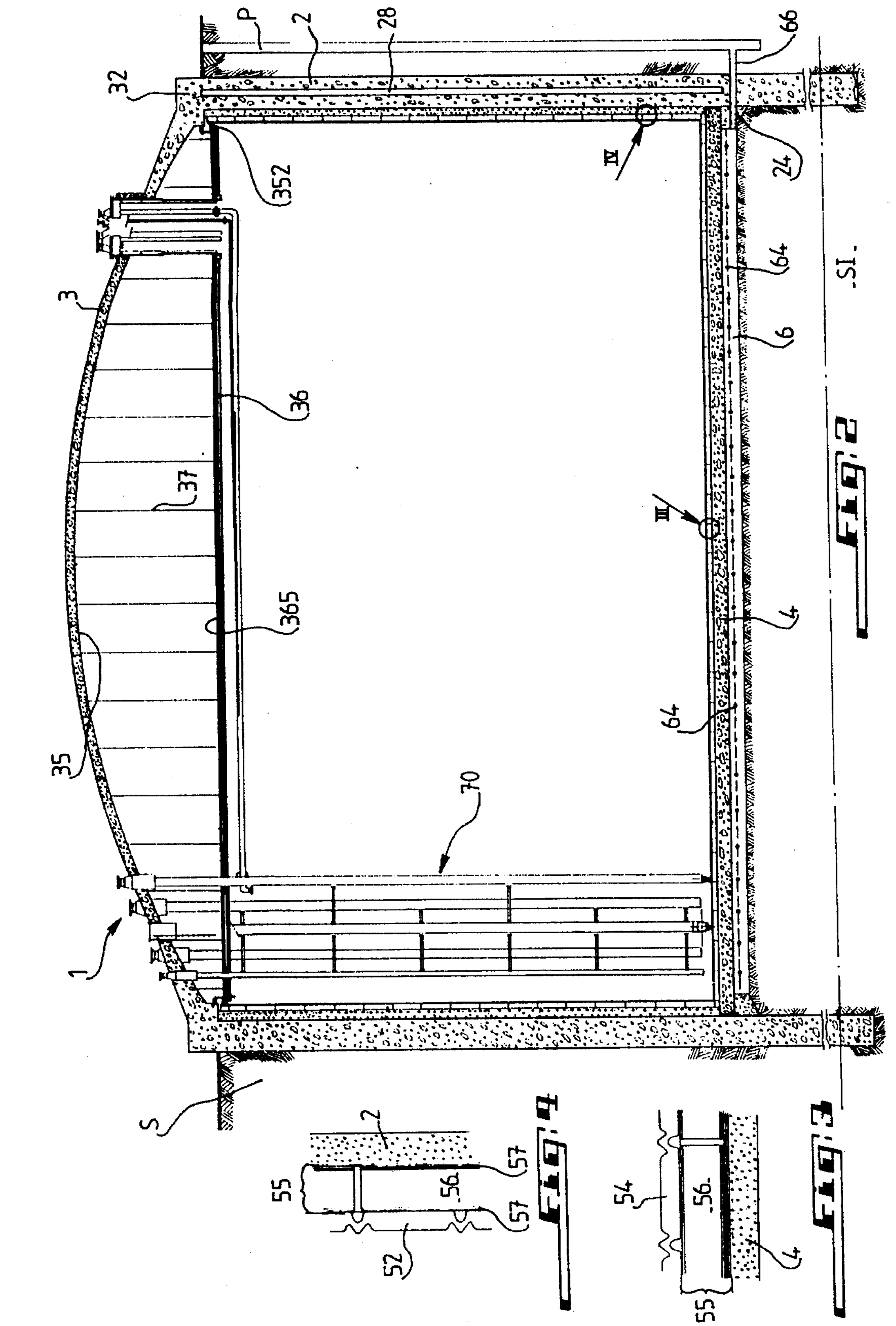
FIG. 2 is a view in vertical section taken upon one diameter of the tank of FIG. 1.
FIG. 3 is an enlarged view of the detail designated at 3 on FIG. 2.
FIG. 4 is an enlarged view of the detail designated at IV on FIG. 2.

At the top of the external enclosure 2 is provided a girder or beam of corresponding shape 32. On FIGS. 1 and 2 is well seen that this so-called crowning or coping beam or girder is integrated both into the enclosure 2 and into the covering dome 3 thereby allowing a good transmission of the forces into or inside of the concrete work as well as a reinforcement of the external enclosure 2. Here the illustrated annular crowning beam 32 has a greater cross-section than that of the enclosure 2 and is made from prestressed and reinforced concrete. More specifically after the erection of the enclosure 2 made from cast concrete, reinforcements and prestressing cables are made fast to and anchored into the latter and that concrete is cast into a shuttering or framing with a shape corresponding to the crowning beam which is desired to be obtained. Thereafter the cables are tensioned or stretched to prestress in a suitable manner the concrete thus cast.

The covering dome 3, in the case where such a dome is provided for the tank 1, is provided by having its building started from the crowning beam 32. In such a case the covering dome 3 is anchored at the upper part of the enclosure 2 through the medium of the beam 32. A metal cupola 35 adapted to form a part of the envelope 5 by forming an internal lining of the dome 3 is manufactured from a lattice or trussed framework of metal girders onto which sheet metal plates are welded. After the manufacture, the cupola 35 which defines a fluid-tight surface corresponding to the dome 3 is made integral with the beam 32. After laying down and fastening of a suitable reinforcement onto the cupola 35, concrete is cast until obtaining the dome 3. According to the aforesaid example, the thickness of the concrete of this covering dome 3 varies from 0.5 to 1.0 m from its center to its periphery. It is at the level of this periphery that the concrete of the dome 3 is connected to that of the beam 32. It is obvious that the cupola 35 remains within the tank 1 after the casting of the concrete and is therefore fastened to the dome 3 which is itself made integral from one piece of material with the beam 3 and the thick enclosure 2.

As stated hereinabove, the metal cupola 35 is integral with the dome 3 and forms a part of the fluid-tight and insulating envelope 5. Here the envelope 5 comprises a metal membrane which is welded onto a shoulder 352 itself integral with the periphery of the cupola 35. This welding of course is continuous and fluid-tight so that this membrane and the cupola form a fluid-tight confinement enclosure.

On FIGS. 3 and 4, respectively, the metal membrane of the enclosure 5 is designated at 54 and 52. It is also seen that the envelope 5 comprises a heat-insulating layer 55. The membrane consists of stainless austenitic steel sheets with a thickness of about 1.2 mm, welded to each other in sealing relationship and is fastened onto the concrete through the agency of the layer 55. These metal sheets which form a confinement pocket are ribbed to withstand the deformations induced by the mechanical and thermal stresses which are applied thereto by the fluid stored within the tank 1.

Referring now to FIGS. 3 and 4, the structure and the way of putting in place the heat-insulating layer of the envelope 5 will be described in detail.

It appears from the drawings that the insulating layer 55 consists of one or several thicknesses of rigid panels 57 made for instance from plywood as well as of at least one thickness of panels made from a preferably impervious foam of plastics material 56. Here the layer 55 comprises when starting from the concrete wall, a series of foam panels 56 sandwiched between two thicknesses of plywood 57. The panels 57 perform the function of distributing the stresses applied to the insulating layer 55 and therefore allow the latter to be better positioned onto the concrete walls. As to the latter, the insulating panels 56 consist for example of blocks of polyurethane (PU)-based or polyvinyl chloride (PVC)-based foam with closed cells.

Likewise the foam panels 56 may be impervious and connected in sealing relationship to each other by fluid-tight connecting fittings in order to form a continuous and fluid-tight additional insulating layer.

One of the faces of the panels 57 in front of the concrete is stuck or adhesively bonded to the latter for example by means of a layer of suitable adhesive material. It is possible to contemplate that the layer of adhesive material be continuous and impervious in order that the latter participates in the fluid-tightness of the tank 1.

It is possible to compensate owing to the adhesive material for the surface defects of the concrete and to avoid the presence of pockets between the concrete and the insulating layer 55.

Figure 5:
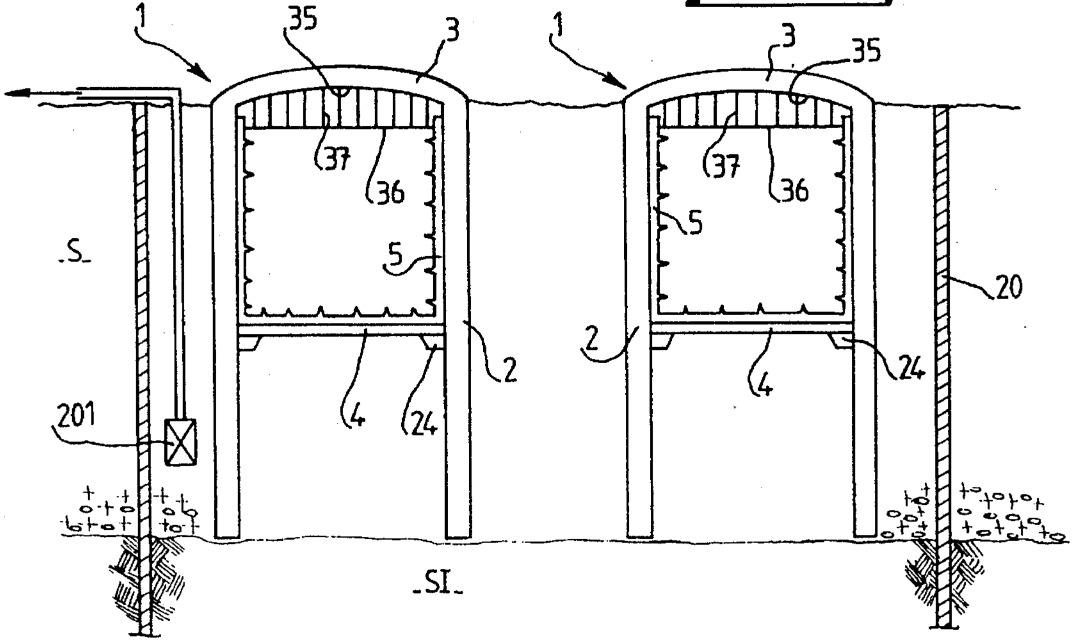
FIG. 5 shows a view in vertical section of an arrangement of buried tanks according to the invention.

Furthermore on FIGS. 1, 2 and 5 it is seen that a hanging roof 36 which is fastened by means of tie rods or cables 37 to the cupola 35 hence to the dome 3 is interposed between the latter and the external enclosure 2. This roof 36 consists of a lattice or trussed framework of aluminum beams itself covered with an insulating layer 365 made for instance from glass wool. Close to the shoulder 352 described hereinabove, the hanging roof 36 is caused to engage with its periphery the insulating envelope 5 of which it forms a part. It is then understandable that this hanging roof 36 as well as its glass wool layer 365 permit to thermally insulate from the fluid contained within the tank 1, the dome 3 and its cupola 35 so as to keep these elements nearly at ambient temperature.

The reference numeral 70 designates on the figures pipings for loading and unloading the fluid to be stored within the tank 1. These pipings 70 which are of conventional type will not be described more in detail here.

Referring now to FIG. 5 there is seen an arrangement of tanks 1 almost similar to those which have just been described. These tanks 1 are buried into a zone of the ground S which is itself enclosed within a substantially fluid-tight, buried and closed wall 20. Advantageously the wall 20 is made through casting into a trench of the ground a fluid-tight and deformable material such as a plastic concrete or a sealing grout or filling for example. For instance four tanks 1 arranged in a square could be confined inside of a buried wall 20 of cylindrical or parallelepipedic shape. Here this wall 20 has a thickness at most equal to those of the external walls 2 of the corresponding tanks 1 and its base projects deeper than the latter into the ground. Preferably the wall 20 extends down into the substantially impervious layer SI. Such a buried enclosure or wall 20 which is substantially fluid-tight thus allows to minimize water seepage into the region where the tanks 1 are established so that the height and especially the thickness of the latter may be reduced to a substantial extent. The reference numeral 201 designates on FIG. 5 a system for pumping the water contained inside of the wall 20. It is understandable that such a system 201 performs the function of discharging out of the wall 20 in order that its level be constantly kept below the level of the flooring beds 4 of the tanks 1 surrounded by this wall 20. Since the water seepage into the ground where the tanks 1 are buried is minimized by the provision of the fluid-tight wall 20, the pumping system 201 of the arrangement of FIG. 5 may be very simple, thereby making this arrangement particularly economical.

The invention is of course not at all limited to the illustrated embodiment but comprises all the equivalents of the technical means described as well as their combinations if the latter are carried out according to its gist and within the scope of the appended claims.

What is claimed is:

1. In a storage tank for confining a fluid such as a liquefied gas, adapted to be installed in cargo loading harbor terminals and to be buried in loose ground which may contain water exerting pressure forces on the tank, said tank comprising a rigid structure including a concrete enclosure, a bottom slab, a covering dome and a fluid-tight heat-insulating envelope which defines a loading space for the fluid in an interior of the structure, said enclosure having the shape of a thick and substantially fluid-tight wall, and said rigid structure being located in a cavity in the ground having a bottom face, lateral faces and a shape substantially corresponding to the shape of said structure, wherein the improvement comprises said enclosure having a base extending at least to a substantially water-tight layer of the ground beneath said bottom face of said cavity and said bottom slab, and said enclosure having an upper end integral with a periphery of said covering dome in one piece of material.

2. A tank according to claim 1, further comprising a draining system including a second flooring bed consisting of porous aggregates arranged upon the bottom of the cavity excavated into the ground and the aforesaid flooring bed and provided with a device for discharging outwards the water having penetrated into the second flooring bed by means of discharge pumps and of wells formed in the ground close to the tank through the medium of ducts formed through the enclosure.

3. A tank according to claim 1, wherein the reinforced slab or flooring bed has a smaller thickness than that of the corresponding external enclosure.

4. A tank according to claim 1, wherein the aforesaid insulating envelope comprises a fluid-tight metal membrane fastened inside of the external enclosure and onto the bottom slab through the medium of a heat-insulating layer.

5. A tank according to claim 4, wherein the aforesaid insulating layer comprises at least one thickness of stress distributing rigid panels as well as at least one thickness of panels made from a foam of plastics material.

6. A tank according to claim 5, wherein the aforesaid foam panels are impervious and connected in sealed relationship to each other by means of fluid-tight connecting fittings so as to form a continuous and fluid-tight insulating layer.

7. A tank according to claim 6, wherein the aforesaid insulating layer is fastened onto the concrete by means of one continuous thickness of adhesive material.

8. A tank according to claim 4, wherein the aforesaid envelope further comprises a fluid-tight steel cupola fastened in sealing relationship with its periphery to the metal membrane and forming an internal lining for the covering dome as well as a hanging aluminum roof and covered with a heat-insulating layer which is interposed between the fluid-tight membrane and cupola so as to keep the latter nearly at ambient temperature.

9. A tank according to claim 8, wherein the aforesaid covering dome and possibly fluid-tight cupola are resting upon the external enclosure of the tank through the medium of a crowning beam of corresponding shape.

10. An arrangement of tanks according to claim 1, wherein the said tanks are arranged inside of a substantially fluid-tight, buried and closed wall the base of which extends down at least to the vicinity of the substantially impervious layer of the ground.

11. The tank of claim 1, wherein said enclosure and said covering dome constitute a single, unitary construction.

12. The tank of claim 1, further comprising a plurality of said seats arranged on said inner face of said enclosure and extending from said inner face toward the longitudinal axis of and into the interior of said enclosure.

13. In a storage tank for confining a fluid such as a liquefied gas, adapted to be installed in cargo loading harbor terminals and to be buried in loose ground which may contain water exerting pressure forces on the tank, said tank comprising a rigid structure including a concrete enclosure, a bottom slab, a covering dome and a fluid-tight heat-insulating envelope which defines a loading space for the fluid in an interior of the structure, said enclosure having the shape of a thick and substantially fluid-tight wall, and said rigid structure being located in a cavity in the ground having a bottom face, lateral faces and a shape substantially corresponding to the shape of the structure, wherein the improvement comprises said enclosure having a base extending at least to a substantially water-tight layer of the ground beneath said bottom face of said cavity and said bottom slab, said enclosure having an upper end integral with a periphery of said covering dome in one piece of material, and at least one seat arranged on an inner face of and integral with said enclosure and extending from said inner face toward a longitudinal axis of and into an interior of said enclosure at the level of said bottom slab, said bottom slab constituting a reinforced concrete flooring bed and being freely supported on said at least one seat integral with said enclosure.

14. A tank according to claim 13, wherein the bottom slab has the shape of a reinforced concrete flooring bed freely resting on the one hand upon said at least one seat integral with the external enclosure and on the other hand upon the draining system.

15. The tank of claim 13, wherein said enclosure is substantially cylindrical and said at least one seat comprises a flange having the shape of an annular bracket such that said bottom slab rests on said annular bracket and is separable therefrom.

* * * * *